3,063,796
**PREPARATION OF AMMONIUM META-
VANADATE**
Andrew D. Kelmers, Warwick, N.Y., assignor to Union
Carbide Corporation, a corporation of New York
No Drawing. Filed Mar. 3, 1961, Ser. No. 93,014
4 Claims. (Cl. 23—51)

The present invention pertains to the production of pure ammonium metavanadate. More particularly, the present invention pertains to a process for production of pure ammonium metavanadate directly from acidic solvent extraction strip solutions in a single precipitation step.

Vanadium extraction from the mother ore commonly is initiated by acid leaching vanadium bearing ore in a sulfuric acid leach solution. The resulting leach liquor is classified by countercurrent decantation to produce a clear leach liquor substantially void of entrained solids and slimes. Vanadium is present in the leach liquor as vanadyl sulfate. Vanadium is removed from the leach liquor by solvent extraction techniques utilizing di(2-ethylhexyl)phosphoric acid organic extractant for example. The loaded organic extractant is then stripped by a sulfuric acid strip solution. Vanadium passes from the organic extractant to the acidic strip solution as vanadyl ion ($VO^{+2}$). The strip solutions commonly contain 10–15 percent sulfuric acid and about 6 to 10 percent vanadium pentoxide as vanadyl ion along with other impurities such as iron, alumina, phosphates and arsenates.

The strip solution is then oxidized with sodium chlorate and partially neutralized with sodium carbonate to precipitate an intermediate sodium polyvanadate containing the above impurities. This product is termed "red cake" due to its characteristic color.

To obtain pure vanadium pentoxide, the precipitate is redissolved in hot ammonium hydroxide and the solution is thickened and filtered to remove hydrated impurities. The clear solution containing vanadium is then treated with ammonium chloride to precipitate ammonium metavanadate which is fused to vanadium pentoxide, the desired final product.

The above-described prior art process realizes about 70 percent recovery of vanadium while requiring numerous steps.

It is an object of the present invention to provide a process for the direct recovery of essentially pure ammonium metavanadate from acidic organic solvent extraction stripping solutions.

It is another object to provide a process for direct recovery of ammonium metavanadate containing as high as 90 percent of the vanadium in the mother ore treated.

It is a further object to provide a process by which the precipitated impurities are readily filtered.

It is still a further object to provide a process for the production of ammonium metavanadate of very high purity.

Further objects will be apparent from the remaining disclosure and the appended claims.

The process which accomplishes the aforementioned objects comprises providing an acidic vanadyl solution containing at least one of the impurities iron, alumina, phosphate or arsenate; providing an aqueous solution of sodium chlorate and sodium carbonate and adding said acidic vanadyl solution to said aqueous sodium chlorate-sodium carbonate solution and simultaneously oxidizing vanadium to the pentavalent state and neutralizing the solution; digesting the solution for a period of time sufficient to maintain vanadium in solution and to allow precipitation of impurities; filtering the precipitated impurities from the solution; adding at least one compound selected from the group consisting of ammonium chloride and ammonium sulfate to the solution to precipitate ammonium metavanadate and removing the vanadium compound from the solution.

It is essential that the vanadyl solution be added to the sodium chlorate sodium carbonate solution to minimize precipitation of sodium polyvanadate of tetravalent vanadium and to prevent excess foaming due to the evolution of carbon dioxide. The sodium chlorate oxidizes some of the impurities thereby aiding in their precipitation as the solution neutralizes.

In this manner, the impurities are selectively precipitated from the strip solution without loss of vanadium.

During addition of the strip solution to the sodium chlorate-sodium carbonate solution there may be some minor amount of precipitation of tetravalent vanadium before sodium chlorate causes oxidation of vanadium to the pentavalent state. The solution is digested at a temperature ranging from 70 to 90° C. for a period of time sufficient to oxidize and solubilize any vanadium compounds which may have precipitated and essentially to allow the complete precipitation of the impurities in a readily filterable form.

The incidental precipitation of small amounts of vanadium during oxidation and neutralization in the present process is distinguished from the formation of large quantities of the polyvanadates of tetravalent vanadium which precipitate when the sodium carbonate-sodium chlorate solution is added to the vanadyl solution. After digestion the solution is filtered to remove the precipitated impurities. The resulting filtrate is a substantially clear solution of pentavalent vanadium ($NaVO_3$) being light yellow in color.

The amount of sodium chlorate required is dependent to some extent upon the type and amount of impurities present and the extent to which they will consume the oxidizer. A sufficient amount of sodium chlorate is required to at least oxidize substantially all the vanadium in the strip solution to the pentavalent state. Preferably in some instances it is desired to add an excess of sodium chlorate up to about 120 percent of the amount stoichiometrically required to oxidize all the vanadium to the pentavalent state. The excess oxidizer will aid in precipitation of the impurities although substantial removal of impurities is achieved without oxidation of the same with sodium chlorate.

Sodium carbonate is added in amounts sufficient to neutralize the solution to a pH of about 7.0.

A temperature of 80° C. is considered the optimum temperature during digestion. A period of one hour is approximately the desired digestion period although the extent of the digestion period may be affected by the type of impurities, the ease with which a filterable impurity precipitate is obtained and the amount of tetravalent vanadium compounds which may happen to precipitate during addition of sodium carbonate and sodium chlorate to the acidic strip solution.

Ammonium chloride and/or ammonium sulfate is added to the filtrate to precipitate pure ammonium metavanadate. Sufficient ammonium chloride or sulfate is used to achieve substantially quantitative precipitation of the vanadium. Precipitation should be carried out at 30° C. or cooler to minimize reagent consumption and may require one or more hours to come to completion.

The precipitate is washed in dilute ammonium chloride or water, for example, to remove any residual sulfate solution and calcined at a temperature ranging from 800 to 900° C. in accordance with well known techniques to produce vanadium pentoxide of high purity.

The barren solution remaining after precipitation may be recycled for use as make-up water in the leaching or countercurrent decantation circuits.

The following example is illustrative of present process.

Three portions of acidic vanadyl sulfate stripping solution resulting from the sulfuric acid stripping of an organic solvent extractant and containing iron, alumina, phosphates and arsenates were respectively added to aqueous solutions containing 100 percent of the stoichiometric amount of sodium carbonate required to neutralize the strip solution irrespective of the amount of sodium carbonate required to precipitate the impurities and 130 percent of the stoichiometric amount of sodium chlorate required to oxidize the vanadium in said stripping solution to pentavalent vanadium. A slurry was formed upon precipitation of the impurities. The slurry was digested for one hour at a temperature of 80° C. and filtered, to remove the impurity precipitate. The resulting clear vanadium bearing solution was mixed with sufficient ammonium chloride and allowed to stand at 25° C. to cause precipitation of ammonium metavanadate. After a period of about 1 to 2 hours the vanadium had substantially precipitated as ammonium metavanadate. The ammonium metavanadate was separated from the barren strip solution and washed with a 5 percent solution of ammonium chloride and dried. The results are tabulated below:

*Percent distribution of $V_2O_5$*

| Test | In the Impurity Cake, percent | In the Barren Strip Solution, percent | Ammonium Metavanadate, percent Recovery of Total in Mother Ore |
|---|---|---|---|
| A | 2.09 | 5.15 | 91.0 |
| B | 1.96 | 5.93 | 89.6 |
| C | 2.11 | 5.18 | 91.3 |
| Average | 2.05 | 5.42 | 90.6 |

*Reagent Consumption*

Lbs./lb. $V_2O_5$ recovered
$Na_2CO_3$ _____ 3.32
$NaClO_3$ _____ 0.26
$NH_4Cl$ _____ 1.45

$V_2O_5$

*Accountability*

Percent of $V_2O_5$
Loss to impurity cake _____ 2.1
Loss to barren strip solution _____ 5.4
Ammonium metavanadate _____ 90.6

Total _____ 98.1

The ammonium metavanadate produced was extremely pure with respect to alkali metal contamination. No sulfate or phosphate was detected chemically. Spectrographic analyses show .05–.1% Fe, 0.005–.02% Na and .01%–.02% Si plus a trace of copper as the only contaminants.

What is claimed is:

1. A process for the production of substantially pure ammonium metavanadate from acidic vanadyl solutions containing at least one of the impurities iron, alumina, phosphate and arsenates comprising providing a solution containing sodium chlorate and sodium carbonate, said sodium chlorate being present in amounts at least sufficient to oxidize substantially all the vanadium in said vanadyl solution to the pentavalent form and said sodium carbonate being present in amounts sufficient to adjust the pH of said acidic vanadyl solution to about 7.0; adding said acidic vanadyl solution to said solution containing sodium carbonate and sodium chlorate; digesting said solution at a temperature ranging from 70 to 90 degrees centigrade for a period of time sufficient to sustain vanadium in solution and to allow precipitation of said impurities; filtering the precipitated impurities from said solution; adding to said solution at least one compound selected from the group consisting of ammonium chloride and ammonium sulfate to cause precipitation of substantially pure ammonium metavanadate; and removing said ammonium metavanadate from said solution.

2. A process for the production of substantially pure ammonium metavanadate from acidic vanadyl solutions containing at least one of the ipurities iron, alumina, phosphates and arsenates comprising providing a solution containing sodium chlorate and sodium carbonate, said sodium chlorate being present in amounts ranging from 100–110 percent of the stoichiometric amount of sodium chlorate required to oxidize the vanadium of said vanadyl solution to pentavalent vanadium and said sodium carbonate being present in amounts ranging from 110 to 130 percent of the stoichiometric amount required to adjust the pH of said acidic vanadyl solution to about 7.0; adding said acidic vanadyl solution to said solution containing sodium chlorate and sodium carbonate; digesting said solution at a temperature ranging from 70 to 90 degrees centigrade for a period of about ½ to 2 hours to sustain vanadium in solution and to allow precipitation of said impurities; filtering the precipitated impurities from said solution; adding to said solution at least one compound selected from the group consisting of ammonium chloride and ammonium sulfate to cause precipitation of substantially pure ammonium metavanadate; and removing said ammonium metavanadate from said solution.

3. A process for the production of substantially pure ammonium metavanadate from acidic vanadyl solutions containing at least one of the impurities iron, alumina, phosphates and arsenates comprising providing a solution containing sodium chlorate and sodium carbonate, said sodium chlorate being present in amounts ranging from 100–110 percent of the stoichiometric amount of sodium chlorate required to oxidize the vanadium of said vanadyl solution to pentavalent vanadium and said sodium carbonate being added in amounts ranging from 110 to 130 percent of the stoichiometric amount required to adjust the pH of said acidic vanadyl solution to about 7.0; adding said acidic vanadyl solution to said solution containing sodium chlorate and sodium carbonate; digesting said solution at a temperature of about 80° C. for a period of about 1 hour; filtering said solution; adding to said solution at least one compound selected from the group consisting of ammonium chloride and ammonium sulfate to cause precipitation of substantially pure ammonium metavanadate; and removing said ammonium metavanadate from said solution.

4. A process in accordance with claim 3 wherein said precipitation is conducted in a solution maintained at ambient temperature.

References Cited in the file of this patent

UNITED STATES PATENTS 2,211,119  Hixon et al. _____ Aug. 13, 1940
2,551,733  Dunn et al. _____ May 8, 1951

OTHER REFERENCES

German application, 1010, 540, printed June 19, 1957, K.I. 16–2.